US011255559B1

(12) United States Patent
Nowlin

(10) Patent No.: US 11,255,559 B1
(45) Date of Patent: Feb. 22, 2022

(54) AUTOMATIC SMOKE REMOVAL SYSTEM

(71) Applicant: William E Nowlin, Columbus, OH (US)

(72) Inventor: William E Nowlin, Columbus, OH (US)

( * ) Notice: Subject to any disclaimer, the term of this patent is extended or adjusted under 35 U.S.C. 154(b) by 0 days.

(21) Appl. No.: 17/409,209

(22) Filed: Aug. 23, 2021

(51) Int. Cl.
*F24F 11/34* (2018.01)
*F24F 110/64* (2018.01)

(52) U.S. Cl.
CPC ........... *F24F 11/34* (2018.01); *F24F 2110/64* (2018.01)

(58) Field of Classification Search
CPC ... F24F 11/33; F24F 2110/64; F24D 2200/18; F24D 2200/10; F24D 2200/07; F24D 2200/04; F24D 2200/043; F24D 2200/046; F24D 2200/06; F24D 2200/062; F24D 2200/065; F24D 2200/067; F24D 2200/26
See application file for complete search history.

(56) References Cited

U.S. PATENT DOCUMENTS

| | | | | | |
|---|---|---|---|---|---|
| 3,198,190 | A | * | 8/1965 | Gordon | F24D 5/00 126/101 |
| 4,194,488 | A | * | 3/1980 | Bellaff | F28D 21/0008 126/112 |
| 4,211,187 | A | * | 7/1980 | Farris | F24D 11/005 122/20 B |
| 4,300,527 | A | * | 11/1981 | Montague | F23L 15/04 126/112 |
| 4,437,511 | A | * | 3/1984 | Sheridan | F24D 11/0257 165/48.2 |
| 4,928,583 | A | * | 5/1990 | Taylor | A62C 2/12 454/236 |
| 5,003,865 | A | * | 4/1991 | Traudt | E04B 1/0023 454/255 |
| 5,039,006 | A | * | 8/1991 | Habegger | F24D 19/1084 236/11 |
| 5,131,887 | A | * | 7/1992 | Traudt | E04B 1/0023 454/255 |
| 5,718,627 | A | * | 2/1998 | Wicks | F24F 11/0001 454/68 |
| 5,855,510 | A | * | 1/1999 | McKenzie | A62C 2/24 454/342 |
| 6,474,086 | B1 | * | 11/2002 | Liu | A62C 35/68 62/183 |

(Continued)

FOREIGN PATENT DOCUMENTS

JP 2007024469 A * 2/2007 .......... F24F 11/0001

*Primary Examiner* — Nelson J Nieves
(74) *Attorney, Agent, or Firm* — Frank H. Foster; Kremblas & Foster

(57) ABSTRACT

Smoke is removed from a building interior by a system in which a controller is activated upon a signal from any of one or more smoke detectors connected thereto. A conduit, with an air-receiving end located in the building and an air-exhaust end located outside the building, has an associated air mover arranged to exhaust air from the building through the conduit. A first and second valve in the conduit are normally closed, preventing air flow. On a smoke detection signal from the controller, the first valve and second valve open, the air mover actuates and air/smoke is withdrawn from the building until a "reset" signal is received. On reset, the air mover shuts down and the first and second valves close. The air-receiving end is preferably directly connected through a forced-air HVAC system of the building to avail use of its ducts and air movers.

6 Claims, 5 Drawing Sheets

(56) References Cited

U.S. PATENT DOCUMENTS

| | | | | |
|---|---|---|---|---|
| 6,681,863 B1* | 1/2004 | Odelros | A62C 2/24 169/56 |
| 6,776,708 B1* | 8/2004 | Daoutis | F24F 7/06 454/229 |
| 6,779,735 B1* | 8/2004 | Onstott | F24F 12/006 236/13 |
| 8,096,862 B1* | 1/2012 | Demster | F24F 13/24 454/237 |
| 10,126,005 B1* | 11/2018 | Carson, Sr | G05D 23/1927 |
| 10,281,165 B2* | 5/2019 | Perez | F24F 11/30 |
| 10,480,803 B2* | 11/2019 | Hatton | F24F 7/06 |
| 10,782,033 B2* | 9/2020 | Perez | F23D 91/02 |
| 2002/0072322 A1* | 6/2002 | Sharp | F24F 11/30 454/229 |
| 2002/0183001 A1* | 12/2002 | Holter | F24F 11/30 454/239 |
| 2007/0209653 A1* | 9/2007 | Beisheim | F23N 3/002 126/80 |
| 2007/0232218 A1* | 10/2007 | Burrow | B08B 15/002 454/342 |
| 2008/0009236 A1* | 1/2008 | Dreher | A62C 35/68 454/256 |
| 2013/0005236 A1* | 1/2013 | Kim | F24F 11/30 454/238 |
| 2014/0061322 A1* | 3/2014 | Hrejsa | G05D 23/1932 236/11 |
| 2017/0138612 A1* | 5/2017 | Kaiser | F24H 3/06 |
| 2017/0211822 A1* | 7/2017 | Perez | F23D 91/02 |
| 2017/0211835 A1* | 7/2017 | Perez | G05B 19/0423 |
| 2019/0242576 A1* | 8/2019 | Gustafsson | F23J 15/06 |
| 2019/0336800 A1* | 11/2019 | Tignor | F24F 11/34 |
| 2020/0080745 A1* | 3/2020 | Ko | F24F 11/64 |
| 2021/0010710 A1* | 1/2021 | Oberlander | F24F 13/0254 |
| 2021/0123624 A1* | 4/2021 | Kronstrom | F24F 11/34 |

* cited by examiner

AUTOMATIC SMOKE REMOVAL SYSTEM

TECHNICAL FIELD

This invention relates to a system that uses heating and/or cooling registers of a building to collect and remove smoke from the building when smoke is detected by any smoke detector in the building, causing the system to be activated. The system operates on a principle of generating a negative pressure point in a furnace or in space, and, more particularly, in the cold/warm air return duct of a furnace.

BACKGROUND OF THE ART

When fires occur in occupied buildings, the hazard presented by smoke far exceeds the hazard presented by the heat and flame of the fire itself. Smoke inhalation has taken the lives of many people who have attempted to save other lives. Further, smoke is a danger to first responders who enter buildings to fight fire, even though these responders are often protected with significant amounts of gear. It is this latter danger that may be the most insidious, as the damage from the smoke and particulate matter borne by the smoke may not emerge until years later. Clear evidence of this is provided by the experience of the New York City first responders of 11 Sep. 2001, but their testimony to this issue is just more "news worthy" than the cancer and respiratory diseases that are seen in every organized fire-fighting unit.

That is just the cost of this problem in terms of human and animal life. However, the physical damage imposed on the facilities is also significant, as smoke alone can cause a structure to be condemned. Buildings tend to be well-sealed, to retain heat or air-conditioning, so there is not a free interchange of aft between the inside and outside of a structure, in a fire situation, smoke rapidly builds up until the sealed nature of the building is breached by the fire. This problem may be exemplified by modern high-rise structures that have no windows that are capable of being opened.

It is, in the inventor's view, an unmet need of the prior art to provide an effective system to remove smoke from the containment of a building. It is especially an unmet need to achieve this by way of retrofit in existing structures, although the inventive concept presented here would be useful even if it was only possible in new constructions.

SUMMARY OF THE INVENTION

These and other unmet needs of the prior art are met by the systems and methods of the present invention.

A system for removing smoke from an interior of a building, comprises a controller, which is in communication with at least one smoke detector of a plurality of smoke detectors in the building. An enclosed passageway formed with a conduit has an air-receiving end located in the interior of the building and an air-exhaust end located exterior to the building. An air mover is in communication with the controller and is arranged for moving air in the conduit from the air-receiving end to the air-exhaust end when actuated. A first valve is in communication with the controller and positioned in the conduit between the air mover and air-receiving end. A second valve is in communication with the controller and positioned in the conduit between the air mover and the air-exhaust end. When the controller receives a signal indicating detection of smoke from any of the at least one smoke detector, the controller proceeds according to preprogrammed instructions in which the first and second valves are moved from a normally closed position to an open position. The air mover is actuated, initiating air movement from the air-receiving end to the air exhaust end, removing smoke. The controller awaits a reset signal from a user. The purpose of the second valve is to prevent outside air from entering the controller housing and possibly, the surrounding area in the building.

A second method to remove smoke from a building such as a hotel, motel, or other building structures that use compact HVAC systems can be accomplished by using the controller alone, the program for which is shown in FIG. 5, would automatically begin a smoke removal process by opening valves 1 and 2, thus providing a path for the smoke to be removed from this area if smoke is detected by any smoke detector in this area. The smoke exit path could be through the exhaust of the existing HVAC system or through a separate exit path through the wall of the room.

BRIEF DESCRIPTION OF THE DRAWINGS

A better understanding will be had from reference to the drawings appended hereto, in which identical parts are identified with identical part numbers and wherein.

DETAILED DESCRIPTION OF THE EMBODIMENTS

Figure 1:
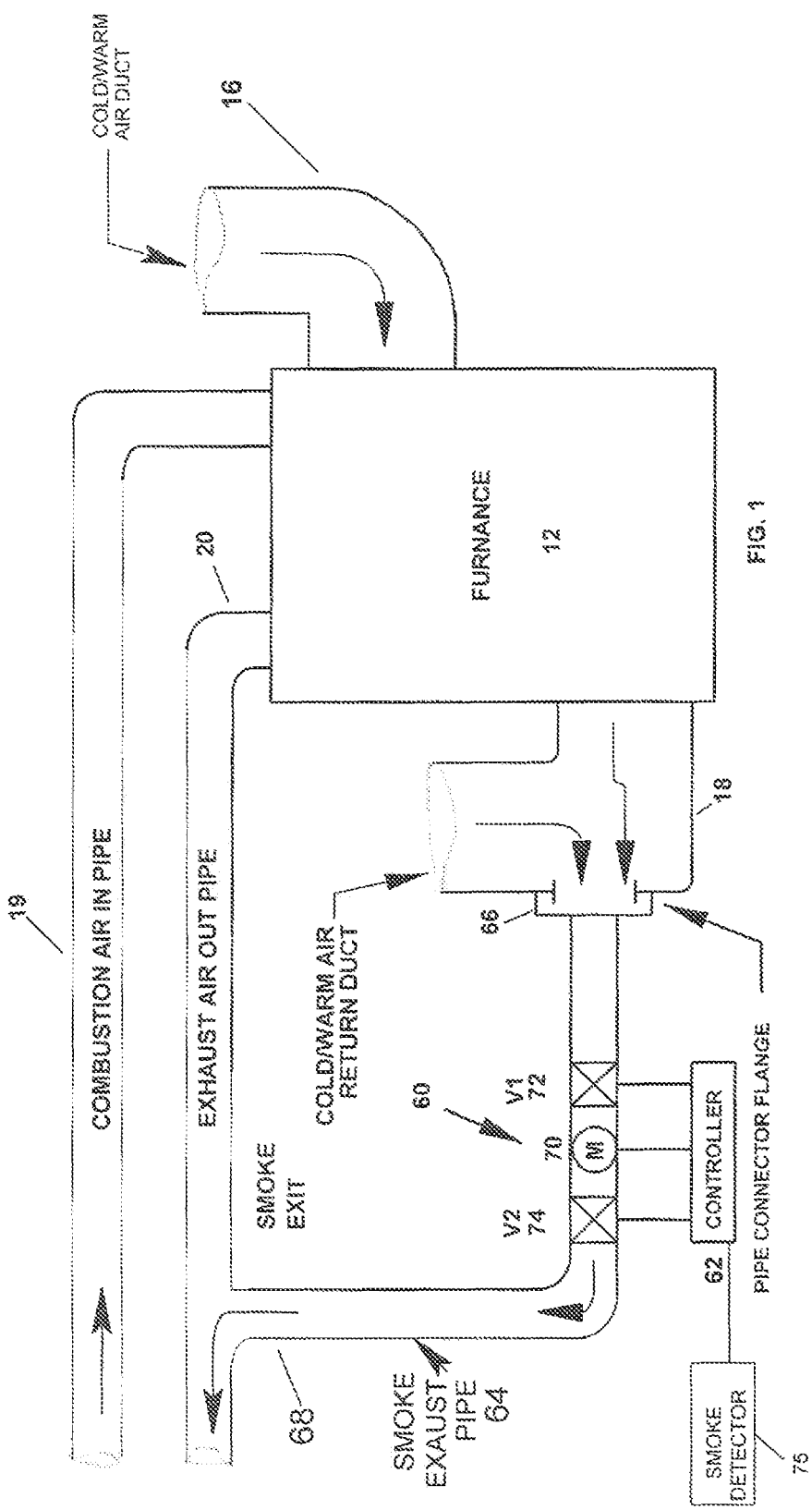
FIG. 1 is a schematic depiction of a furnace with a first embodiment of an automatic smoke removal system of the invention.
Figure 2:
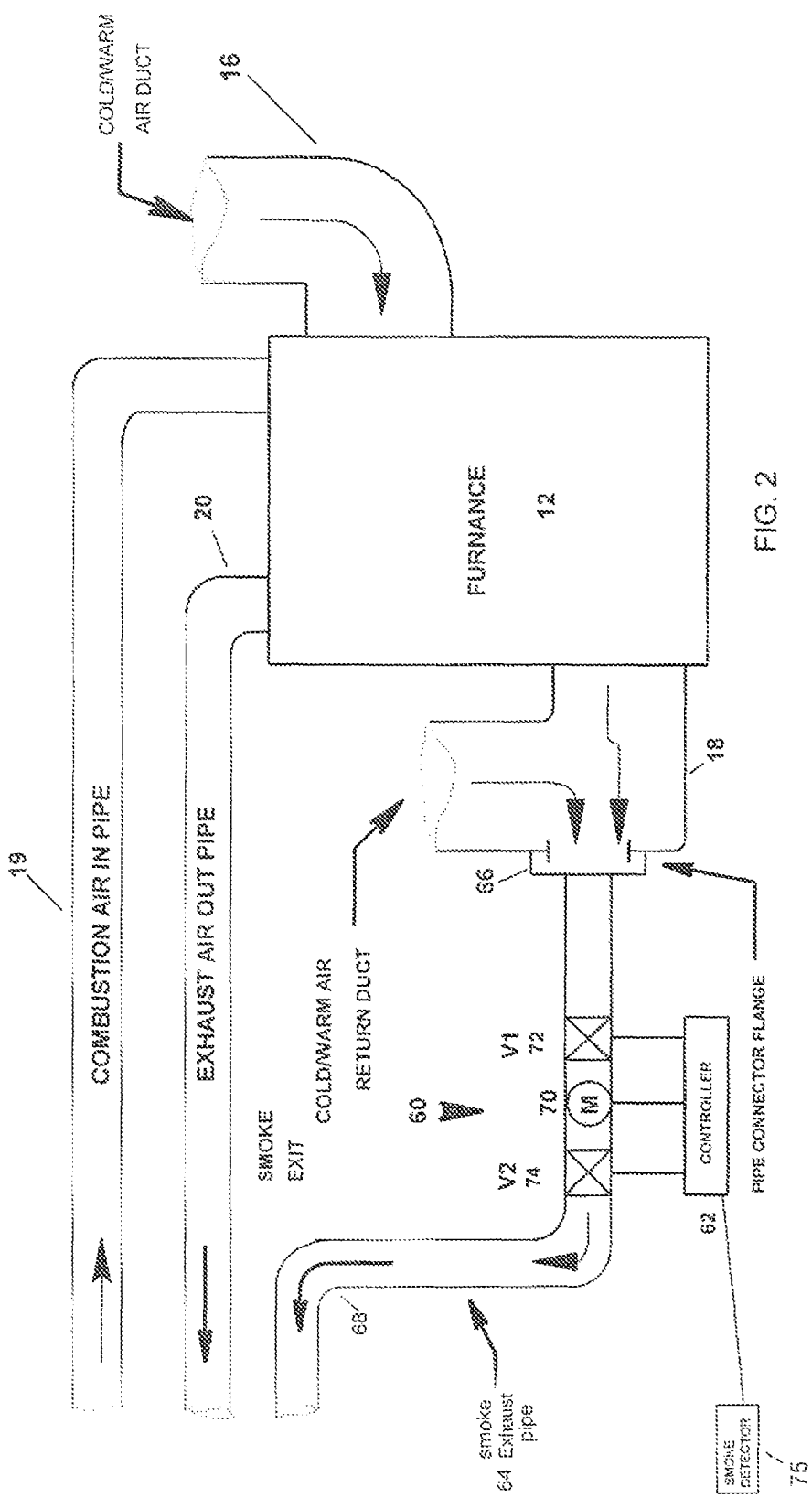
FIG. 2 is a schematic depiction of a furnace with a second embodiment of an automatic smoke removal system of the invention.
Figure 3:
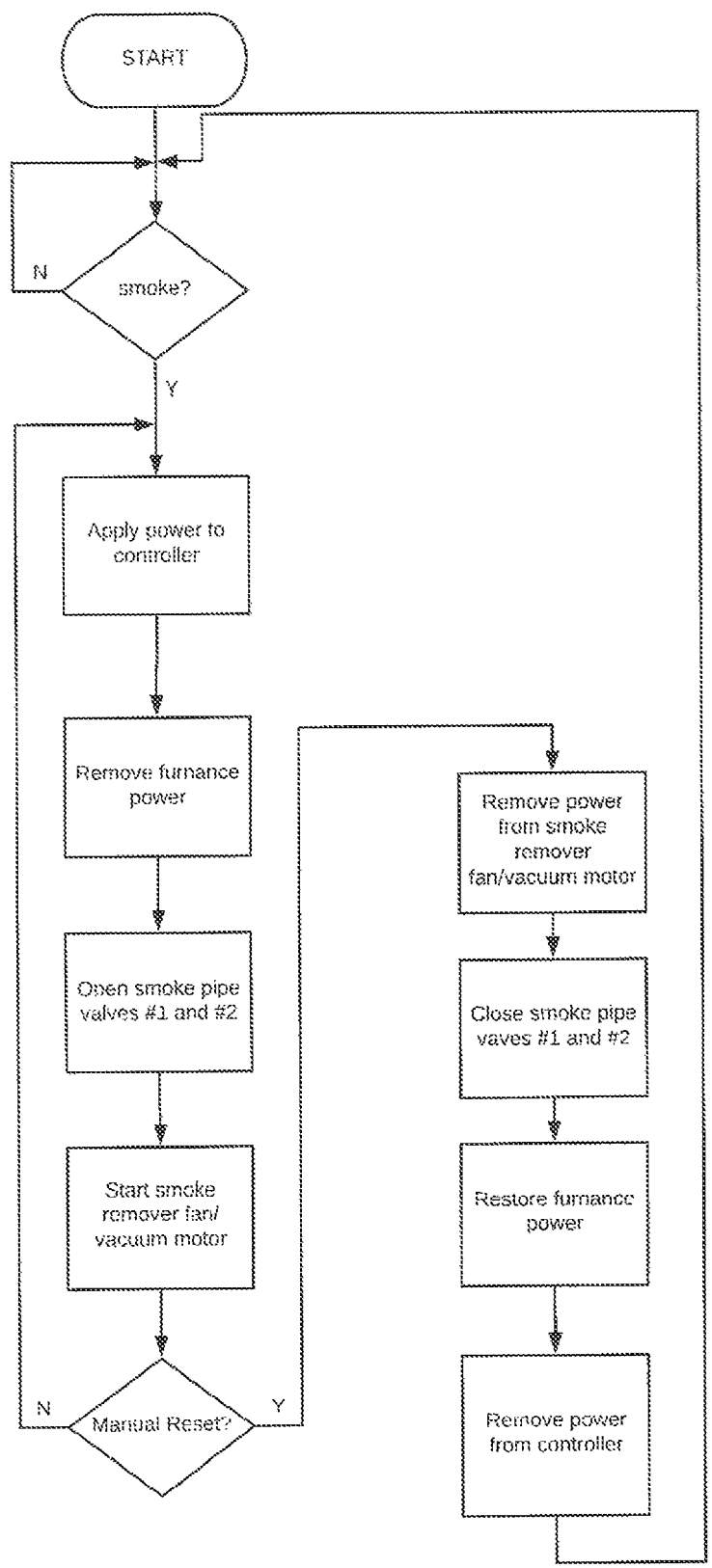
FIG. 3 is a flow diagram for a control algorithm for operating the smoke removal system as integrated with a furnace.

FIG. 1 and FIG. 2 show a schematic and operational depiction of an HVAC system that has been modified to include the smoke removal features provided by a smoke removal system 60 according to the invention. In this configuration, when smoke is detected, by any one of a plurality of smoke detectors, controller 62 will be activated and will cause smoke to be removed from the building via conduit 68. FIG. 3 shows the program flow for system 60.

In the embodiment of FIG. 1 conduit 68 is connected to the post combustion exhaust air conduit from the furnace so that smoke will be removed through the same post combustion exhaust air conduit. In the embodiment of FIG. 2 the smoke exit conduit 68 is a separate, additional conduit that leads outside the building independently of the HVAC system.

In both FIG. 1 and FIG. 2, the air mover 70 is shown installed in the conduit 64 between valve V1/72 and valve V2/74. The purpose of valve 74 is to prevent outside air from entering the controller module 60 and possibly leaking into the space surrounding the module which contains the components of item 60.

Air mover 70 is a fan that can generate a negative pressure point in the furnace cold/warm air return duct of the furnace. Up-stream of valve 72, conduit 64 is tapped into the treated (heated or cooled) air duct 18.

The controller 62 is in communication with at least one smoke detector 75 in the building. The conduit 64 has an air-receiving end located in the interior of the building and an air-exhaust end leading through conduit 68 to the exterior to the building. The air mover 70 is in communication with the controller 62 and is arranged for moving air in the conduit 64 from the air-receiving end to the air-exhaust end when actuated. The first and second valves 72 and 74 are in communication with the controller 62 and positioned in the conduit 64 on opposite sides of the air mover 70 between the air-receiving end and the air-exhaust end. When the controller receives a signal indicating detection of smoke from any of the at least one smoke detector 75, the controller proceeds according to preprogrammed instructions in which the first and second valves are moved from a normally closed position to an open position. The air mover 70 is actuated, initiating air movement from the air-receiving end to the air-exhaust end, thereby removing smoke. The controller awaits a "reset" signal from a user, maintaining the first and second valves in an open position and the air mover in an actuated condition until a "reset" signal is received. When a "reset" signal is received, the controller de-actuates the air mover 70 and signals the first and second valves 72 and 74 to move to the normally closed position.

Figure 4:
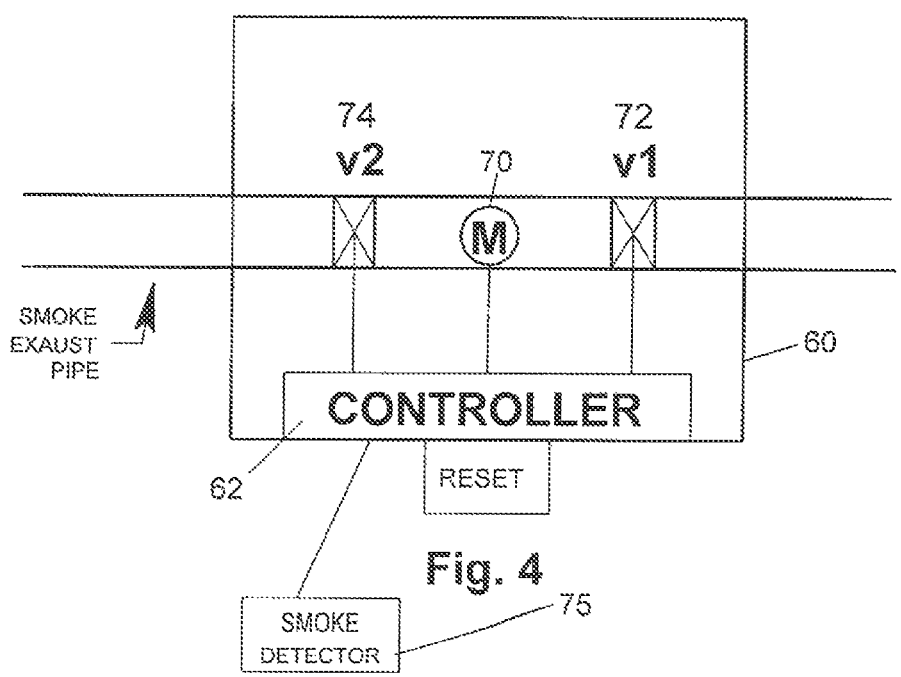
FIG. 4 shows a basic view of the controller components.

FIG. 4 Shows the outline of the automatic smoke removal system controller. When smoke is detected by any one smoke detector 75 in an area where a combination/compact heating and air conditioning system is used, the controller will cause the smoke laden air be removed due to a negative pressure point being developed upwind/upstream of valve V1/72 in exhaust pipe 64 and further upstream in the cold/warm air return ducts which open at their ends into the rooms of the building.

Figure 5:
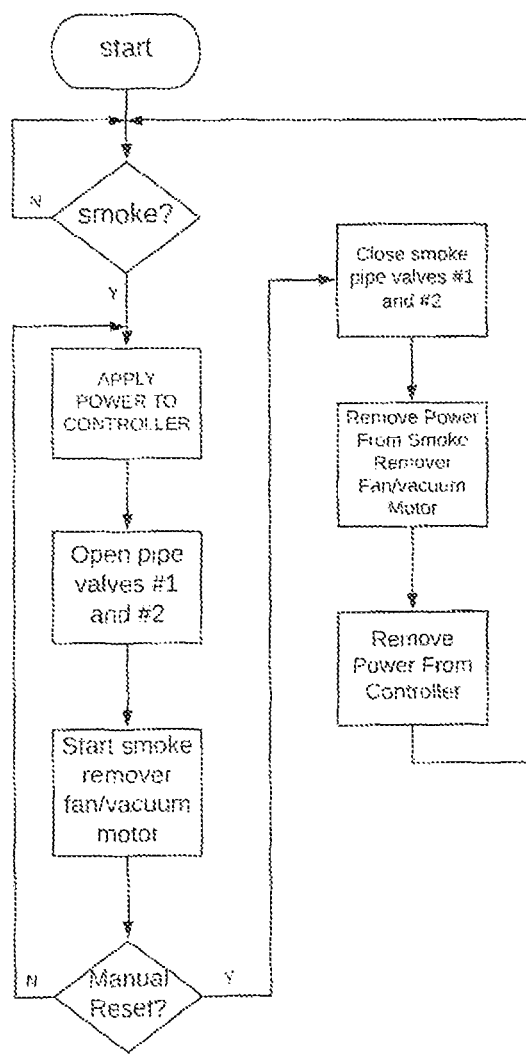
FIG. 5 is a flow diagram for a control algorithm for operating the smoke removal system independently of a furnace.

FIG. 5 shows the operational flow chart for an embodiment of my invention which does not require a furnace. This configuration could be used in hotels, motels, and other locations where combination heating and cooling units/systems are used instead of a furnace. The unit 60 (the controller) does not require a furnace for its operation. In such an embodiment, the upstream end of the conduit 64 is connected directly to a cold/warm air return duct 16. In other words the heated or cooled enclosed passageway through the plenum of the furnace 12 is replaced with conduit. When smoke is detected by any one smoke detector 75 of a plurality of smoke detectors that may be in this location, the unit 60 will cause valves 72 and 74 to open and air mover 70 to begin removing smoke from that location via conduit 68 which could be connected to the exhaust of the combination HVAC system or through a separate exit point through which the smoke could be removed from this area. As the flowchart shows, the unit will continue to run until a manual reset is received. Upon receiving a manual reset, it will close valves 1 and 2, remove power from the smoke remover fan/vacuum motor and remove power from the controller 60. The controller 60 will not consume any power until smoke is detected again.

Referring again to FIG. 1 or FIG. 2, in the case of an electric furnace, the automatic smoke removal system can be implemented by connecting the controller 60 input to the warm/cold air return duct of the electric furnace. If smoke is detected by at least one smoke detector in this facility, the controller will cause valves 1 and 2 to move from a closed to an open position and the air mover 70 will begin removing smoke from the building, and will continue to run until a reset signal is received.

The elements of the smoke removal system 60 are now introduced into this pre-existing setting as shown in FIG. 1 and FIG. 2. It should be noted that the smoke removal system 60 may be retrofitted to many, if not the vast majority of, existing recirculating air systems. In the first embodiment shown in FIG. 1, the smoke removal system 60 comprises a conduit 64 with an air-receiving end 66 located in the building and an air-exhausting end 68 located exterior to the building. Between the ends 66 and 68 of the conduit 64, an air mover 70 is provided. The purpose of the air mover 70 is to draw air from the air-receiving end 66 and force it out the air-exhausting end 68. The smoke removal system 60 also has a first valve 72 that is positioned in the conduit between the air-receiving end and the air mover. The purpose of valve 74 is to prevent outside air from entering the building when the smoke removal system is not active.

In both FIG. 1 and FIG. 2, the air mover 70 is shown installed in the conduit 64 between the first valve 72 and second valve 74.

The difference between FIGS. 1 and 2 is that FIG. 1 shows an embodiment where the conduit 64 taps directly into combustion gas outlet pipe 20 to exhaust smoke outside the building, and FIG. 2. shows a smoke exit from the building via a separate conduit.

FIGS. 3 and 5 set out embodiments of algorithms under which the smoke removal system of the inventive concept is implemented. FIG. 5 shows the flow chart for controller 62 of an automatic smoke removal system that can be used to remove smoke from the building via a connection to the outlet of an existing HVAC system, with no furnace system. The smoke could be removed through an output connection of the combined heating and cooling systems or by a separate outlet exit in the building wall when smoke is detected by at least one smoke detector in that area. These HVAC systems are typically found in hotels, motels, and other locations.

The controller is a Programmable Logic Controller or a microprocessor computing circuit which would cause valves V1 and V2 to open when smoke is detected and cause the air mover 70 to begin running to remove smoke from the building via an inlet pipe to the controller module. The outlet of the smoke exit pipe terminates at the exterior of the building.

The invention claimed is:

1. An apparatus for removing smoke from the interior of a building, the apparatus comprising:
   (a) an enclosed passageway extending through an air duct having an opening into a room in a building at an upstream end of the passageway;
   (b) a first conduit connected at one end to the enclosed passageway and having at least one valve and an air mover configured for moving and drawing air and smoke in a direction into the air duct opening, through the enclosed passageway and through the first conduit;
   (c) a second conduit connected to an opposite end of the first conduit and forming a smoke exit passageway;
   (d) a controller connected to the valve and configured to cause the valve to open when smoke is detected and cause the air mover to begin running to remove smoke from the building; and
   (e) a smoke detector connected to the controller and configured to apply a smoke detection signal to the controller when smoke is detected; and
   (f) at least two valves positioned in the first conduit, one valve positioned upstream of the air mover and one valve positioned downstream of the air mover, the valves being connected to the controller and the controller is configured for actuation of the valves.

2. A smoke removal apparatus according to claim 1 wherein the second conduit forming a smoke exit passageway extends to the exterior of the building.

3. A smoke removal apparatus according to claim 1 wherein the enclosed passageway includes and extends through an air heating or cooling plenum and an air return duct of an HVAC system or furnace.

4. A smoke removal apparatus according to claim 3 wherein the second conduit forming a smoke exit passageway that leads to the exterior of the building is connected to a post combustion exhaust air out pipe that is installed to transport exhaust air from a combustion chamber of a furnace to the exterior of the building.

5. A smoke removal apparatus according to claim 3 wherein the second conduit forming a smoke exit passageway extends to the exterior of the building.

6. A smoke removal apparatus according to claim 3 wherein a manual reset switch is connected to the controller and the controller is configured to de-actuate the air mover and close each valve in response to actuation of the reset switch.

* * * * *